Patented Dec. 29, 1953

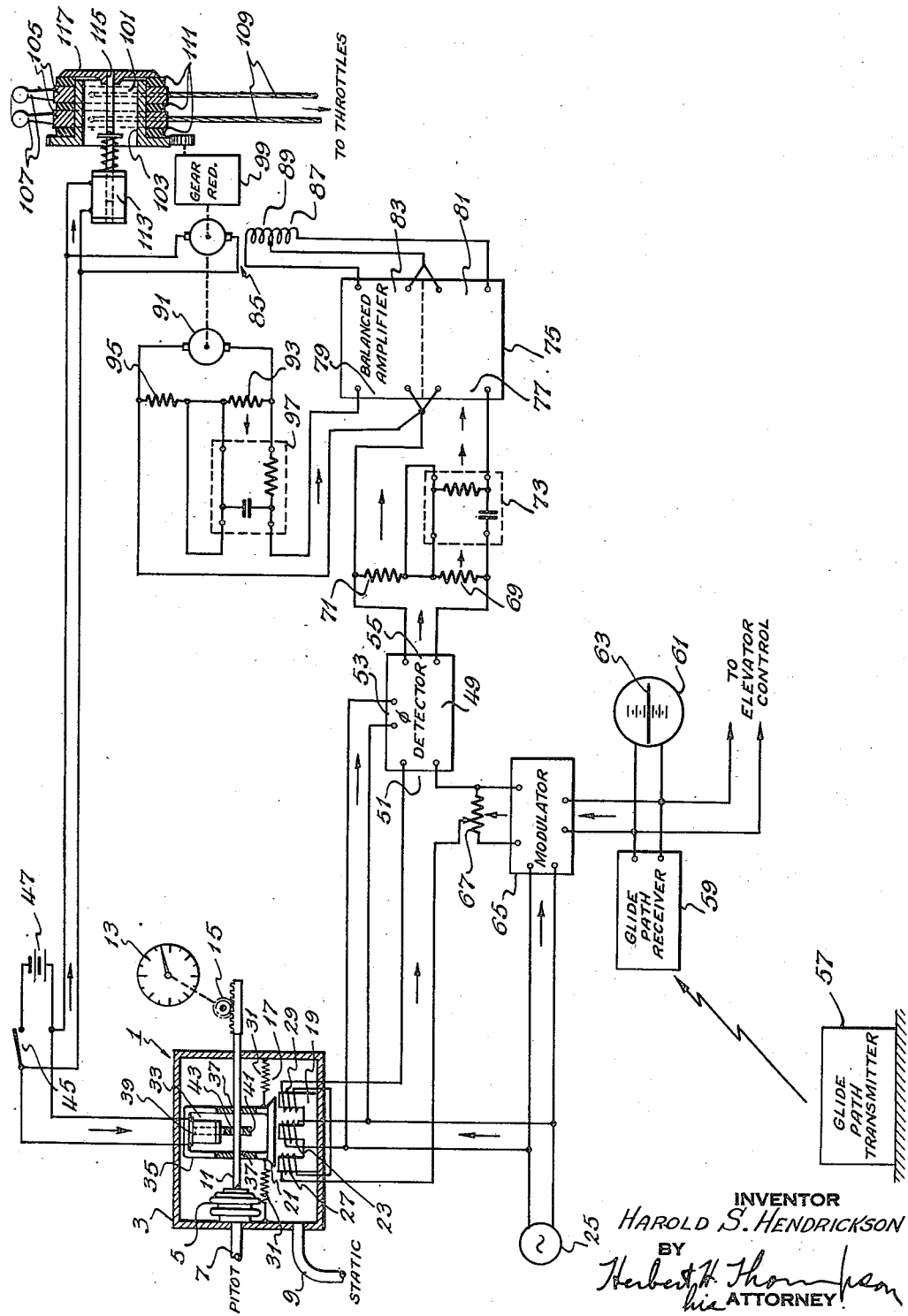

2,664,254

UNITED STATES PATENT OFFICE 2,664,254

AIR-SPEED CONTROL SYSTEM

Harold S. Hendrickson, Hempstead, N. Y., assignor to The Sperry Corporation, Great Neck, N. Y., a corporation of Delaware Application January 21, 1950, Serial No. 139,943

8 Claims. (Cl. 244—77)

This invention relates to improvements in the art of automatic control of aircraft, and particularly to airspeed control. Airspeed depends upon, among other things, the amount of power supplied by the propulsion system, and it can be varied within limits by adjustment of fuel flow control means such as a throttle or throttles. Copending U. S. patent application, now Patent 2,626,757, dated January 27, 1953, of Richard N. Bromley, and entitled Automatic Speed Control System, describes and claims a system wherein the throttle of an aircraft motor is operated automatically according to small deviations in the airspeed from a selected value to keep the craft flying substantially at said selected airspeed.

Since the airspeed does not depend solely upon throttle opening, the throttle is not set with respect to a fixed reference position in response to airspeed deviation, but is set with respect to a temporary reference position, which is in effect the position it was in just before the airspeed deviation or error was detected and utilized to reset the throttle. This arrangement permits a repeat back loop for matching the displacement of the driven device (the throttle) against the input control signal (airspeed error) similar to that used in more conventional control or servomotor systems, and minimizes or eliminates steady-state errors which otherwise would be produced by such factors as the loading and attitude of the craft and the adjustment of flaps and propeller pitch.

While the above described Bromley system is entirely satisfactory in cases where only the airspeed and factors not directly related thereto (for example, direction of flight) are under control, it has been found that cyclic variation in speed or "hunting" will result if an attempt is made to use this system in combination with automatic approach systems which control the elevator surfaces to make the craft follow a selected glide path. This difficulty results from the fact that the airspeed depends upon the pitch attitude of the craft, but a change in pitch attitude is followed by, rather than simultaneously accompanied by, a change in airspeed.

Thus, if the craft is above the glide path, the elevators will be controlled to make the craft fly down. This will alter the pitch attitude toward a nose-down position, and the airspeed will increase while the craft approaches the glide path. The increase in airspeed will cause the throttles to be reset for a lower airspeed, and the craft will be slowing up at about the same time that the pitch attitude is being returned to normal by the reduced deviation from the glide path. The reduction in nose-down pitch attitude will tend to decrease the speed still further, calling for an unduly large increase in throttle opening. The oscillations in speed may die down after two or three cycles, or may continue as long as the automatic approach system works to maintain the craft on the glide path. In either event, such oscillations are highly undesirable, and they will be re-excited each time the glide path control system calls for a correction, either in the downward direction as just described, or in the upward direction.

One of the principal objects of the present invention is to provide methods and means for preventing or minimizing hunting in automatic airspeed control systems.

More specifically, it is an object of this invention to control airspeed not only as a function of airspeed deviation, but also as a function of deviation in position of the aircraft vertically with respect to a predetermined flight path or glide path, which, of course, is closely associated with, and normally corrected for, by a change in attitude of the craft to cause ascent or descent to a new or corrected flight path.

In another aspect, one of the objects is to provide improved automatic approach or glide path systems in which the airspeed, as well as the flight path of the craft, is controlled automatically.

Another object of the invention is to provide a combined airspeed control and flight path control system wherein the flight path control elements function also as anticipation or anti-hunt means for the airspeed control elements.

The invention will be described with reference to the accompanying drawing, which schematically illustrates an embodiment thereof in a combined automatic airspeed control and approach or glide path control system.

In the drawing, the numeral 1 designates generally an airspeed meter comprising a chamber 3 containing a Sylphon bellows 5. Total air pressure, i. e. static plus velocity head is supplied to the interior of the bellows 5 through a tube 7, which is connected outside the aircraft to a Pitot tube, not shown. Another tube 9 supplies static air pressure to the chamber 3 outside the bellows 5. A rod 11 is secured to the bellows to be moved thereby as the bellows expands and contracts with variations in airspeed. The longitudinal position of the rod 11 is a measure of airspeed, which may be indicated by a dial and pointer arrangement 13 coupled to the rod 11 by a rack and pinion 15.

A signal pickoff device 17 is provided in the chamber 3 and is arranged to be coupled to the rod 11. The device 17 includes an E-shaped core 19 of magnetic material, and an armature 21. A winding 23 on the central leg of the core 19 is connected to an alternating current source 25. Pickup windings 27 and 29 on the outer legs of the core 19 are connected in series opposition so that when the armature 21 is in its central position, equal and opposite voltages are induced in the coils 27 and 29 and the net output is zero. When the armature 21 is displaced one way, say to the left, more voltage is induced in the coil 27 than in the coil 29, and the difference, which is the net output, is a function of the displacement and is in phase with the voltage of the source 25. When the armature 21 is displaced the other way, the output voltage is likewise a function of the displacement, but is 180 degrees out of phase with the source 25.

The armature 21 is normally biased to its central position by means of springs 31. It may be engaged with the rod 11 by means of a magnetic clutch device 33 which as illustrated herein comprises a U-shaped yoke 35 secured to the armature 21 and provided with holes 37 through which the rod 11 passes loosely. The yoke carries a solenoid magnet 39 whose armature 41 has a hole 43. The rod 11 also passes loosely through the hole 43. The solenoid 39 is connected through a switch 45 to a direct current source 47. When the switch 45 is closed, the solenoid 39 pulls its armature 41 up, gripping the rod 11 between the lower side of the hole 43 and the upper sides of the holes 37, and thus couples the armature 21 to the rod 11. When the switch 45 is open, the rod 11 is free to move independently of the armature 21, which is then maintained at its central position by the springs 31.

The above described airspeed indicator and pickoff is substantially the same as that described in the previously mentioned Bromley patent, and is utilized as explained hereinafter to provide a control signal corresponding to the deviation in airspeed from the selected value. In accordance with the present invention, a further signal, corresponding to vertical deviation of the craft from a selected flight path, is combined with the airspeed-deviation signal to control the airspeed.

To produce the vertical deviation signal a radio glide path system may be used. This includes a ground transmitter 57 which produces overlapping differently modulated field pattern lobes or other directionally characteristic radiation defining a particular flight path. The aircraft carries a receiver 59 responsive to the transmitter 57 and containing the necessary detector apparatus to provide an output signal corresponding to vertical deviation of the craft above or below the flight path. Such radio glide path apparatus is well known and therefore is not described in detail here.

The receiver means 59 may be arranged to provide a direct voltage output whose magnitude depends upon the extent of the vertical deviation, and whose polarity depends upon whether the craft is above or below the desired flight path. This output is supplied to a conventional cross pointer indicator 61 to control the position of the nominally horizontal pointer 63, and to the pitch or elevator control input terminals of an automatic pilot mechanism, not shown.

The vertical deviation signal from the receiver 59 is also applied to a modulator 65, which is connected to the A.-C. supply 25 to provide an A.-C. output which varies in amplitude and phase according to the magnitude and polarity of the signal from the receiver 59. The output circuit of the modulator 65 is connected in series with the windings on the airspeed pickoff 17, and the combined airspeed and vertical deviation signals are applied to the input terminals 51 of a phase detector 49. The connections are such that the vertical deviation signal corresponding to deviation above the glide path is of the same phase as the airspeed pickoff signal corresponding to displacement of the armature 21 toward the core leg carrying the coil 29, i. e. to the right in the drawing. An adjustable voltage divider 67 is provided in the output circuit of the modulator 65 for regulating the effect of the vertical deviation signal upon the composite control signal.

The phase detector 49, which is of known type and may be identical with that described in the aforementioned Bromley patent, has reference phase input terminals 53, and output terminals 55. The reference phase input terminals are connected to the A.-C. source 25. The output of the detector 49 is a direct voltage whose magnitude depends upon the amplitude of the A.-C. input to the terminals 51, and whose polarity depends upon whether said A.-C. input is in phase or 180 degrees out of phase with the source 25.

The output of the phase detector 49 is applied to a voltage divider comprising two series-connected resistors 69 and 71. The voltage appearing across the resistor 69 goes through a rate circuit or differentiating circuit 73, which may be a high-pass filter, for example an L-section RC circuit. The voltage across the resistor 71 is added by a series connection to the output terminals of the rate circuit 73, providing a combined voltage which is proportional to the sum of the output of the phase detector 49 and the time derivative of said output.

A balanced amplifier 75, which may comprise two substantially identical D.-C. amplifiers, includes two sets of input terminals 77 and 79 and corresponding pairs of output terminals 81 and 83. The two amplifier sections may be made to have equal gains, so that equal voltages at the input terminals 77 and 79 will produce equal output voltages at the terminals 81 and 83.

A reversible motor 85 is provided with two field windings 87 and 89 which are connected to the output terminals 81 and 83 respectively of the amplifier 75. The armature of the motor 85 is connected to the D.-C. source 47 by way of the switch 45. The shaft of the motor 85 is coupled to a tachometer generator 91, which may be a small permanent magnet D.-C. generator.

The generator 91 is connected to a voltage divider comprising series connected resistors 93 and 95. Any voltage across the resistor 93 goes to an integrating circuit 97, which may be simply a low-pass filter. The output terminals of the integrating circuit are connected in series with the resistor 95 to the input terminals 79 of the balanced amplifier 75. The connections are so arranged that the output of the generator 91, after passing through the amplifier 75, is applied to the field 89 of the motor 85 in such polarity as to oppose the rotation of the motor 85 and generator 91.

The shaft of the motor 85 is also coupled through reduction gearing 99 to a throttle operating mechanism 101 or other mechanism by which the engine of the craft is controlled. This mechanism includes a flanged tubular member 103 loosely supporting one or more rings 105 provided with manually operable throttle control handles 107 and connected to respective throttles as by cables 109. The rings 105 are separated from each other and from the flange on the member 103 by friction washers 111.

A solenoid magnet 113 is connected to the D.-C. source 47 through the switch 45, and its plunger carries a shaft 115 which extends through the tubular member 103 and supports a disc 117 coaxially at the end of the ring and washer assembly. When the switch 45 is closed, the solenoid 113 forces the disc 117 to the left, compressing the rings 105 and washers 111 together and against the flange on the member 103, thus coupling the motor 85 to the throttles.

In the operation of the described system, the switch 45 is initially left open and the throttles (assuming that the craft has more than one engine) are adjusted manually to equalize the loads on the engines and to bring the craft to the desired airspeed, as indicated by the dial and pointer 13. The craft is also maneuvered to place it on the desired glide path, as indicated by the meter 61. During this time the pickoff armature 17 remains centered, the motor 85 is deenergized, and the throttle operating mechanism is disengaged.

When the desired airspeed is attained, the switch 45 is closed, energizing the solenoids 39 and 113 to couple the pickoff armature 21 to the rod 11 in the airspeed meter and couple the motor 85 to the throttles, as well as energizing the armature of the motor 85. As long as the airspeed remains at the selected value, the pickoff 17 produces no output. Assuming for the present that the craft remains on the selected glide path, there will be no signal applied to the input terminals 77 of the amplifier 75. Also, since the motor 85 and the generator 91 are stationary, no signal will appear at the input terminals 79. Accordingly neither of the field windings 87 and 89 will be energized and the motor 85 will continue to remain stationary.

Upon increase or decrease of airspeed, the pickoff 17 will produce an "airspeed error" signal, corresponding to the airspeed deviation. This signal is converted to D.-C. by the detector 49, modified by the rate circuit 73, and amplified by the lower side of the balanced amplifier 75 to energize the field 87 of the motor 85. The polarity of this energization depends upon whether the airspeed is above or below the selected value, and the motor rotates accordingly to close or open the throttles. At the same time, the motor 85 drives the tachometer generator 91. The output of the generator 91 is a signal proportional to the rate or speed of the throttle motion, and consequently is approximately proportional to the rate of change of airspeed as effected by the throttle motion. The integrating circuit provides an output which approximates the time integral of the throttle speed signal, and is therefore roughly proportional to the accumulated change in throttle position. Since the integrating circuit 97 will discharge slowly, either through the input circuit of the amplifier 75 or through a resistor provided for that purpose, its output is not truly proportional to the throttle displacement and will gradually decrease to zero as the throttle rate signal becomes zero. This throttle displacement signal, in addition to the part of the throttle rate signal appearing across the resistor 95, is amplified by the upper side of the balanced amplifier to energize the field 89 of the motor 85, in such polarity as to oppose the present rotation. When the sum of the throttle displacement and throttle rate signals becomes equal to the sum of the airspeed error and error rate signals, the fields 87 and 89 are energized equally and oppositely, and the motor 85 stops. If the airspeed error has diminished to zero by this time, all of the signals to the amplifier 75 become zero and both fields 87 and 89 are deenergized. If there is still an airspeed error, or a further change in airspeed occurs, the operation will continue or repeat until the airspeed is adjusted to the selected value.

The system so far described has special application and advantages for use in automatic approach systems for aircraft where the craft is approaching a landing field on a radio glide path beam, or in fact, whenever the craft is following a radio path in elevation. In such case any deviation above or below the selected path will make the craft nose down or nose up to correct the error. Since it takes less power to fly down than to fly level, and more power to fly up, the airspeed will tend to increase or decrease as vertical deviations from the glide path are corrected by the elevator control.

In the present system, these changes in airspeed are anticipated and substantially prevented by adding a portion of the vertical deviation or altitude error signal, to the airspeed error signal. The modulator 65 converts the reversible-polarity D.-C. vertical error signal to a reversible phase A.-C. signal similar to the airspeed error signal. Since the change in airspeed caused by the elevator control lags the vertical deviation from the glide path, the voltage divider 67 may be adjusted to add the airspeed error signal just enough of the altitude error signal to compensate for the change in airspeed.

Now, assuming that the airspeed is at the desired value but the craft gets above or below the desired path, a signal initiated by receiver 59 and introduced into voltage divider 67 will first be applied as an airspeed correction signal to the airspeed control system, including the motor 85 while the altitude is being corrected through that portion of the signal from receiver 59 which goes to the elevator control of the gyro pilot and before the airspeed is changed as the result of a change in the elevator controls. Thus the airspeed will remain substantially constant throughout the automatically controlled vertical maneuver and the initiation of hunting is prevented. If the airspeed changes from some other cause while the altitude is being corrected, the airspeed error signal will further actuate the motor 85, in the same manner as if the craft were in level flight, to correct the airspeed.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. An aircraft speed control system for automatic approach to landing fields including means responsive both to airspeed of the craft and to deviation of the aircraft from a selected radio flight path to provide a control signal, means responsive to said control signal for moving the engine throttle so as to maintain the airspeed of the craft substantially at a selected value, means for producing a rate signal proportional to the rate of such throttle movement, means for integrating said signal, and means for modifying said control signal by said integrated signal to furnish a follow-back throttle displacement correction which decays with time.

2. An aircraft speed control system for automatic approach to landing fields including airspeed measuring means, means responsive thereto to provide a signal dependent on deviation in airspeed of the craft from a selected airspeed value, means for providing a further signal dependent on vertical deviation of the aircraft from a selected flight path, means for combining said signals in such sense that deviation above the selected flight path provides a signal which aids the signal provided in response to deviation above the selected airspeed, means responsive to said combined signals to move the engine throttle to prevent changes of airspeed due to flight path corrections, means for producing a rate signal proportional to the rate of such throttle movement, means for integrating said signal, and means for modifying said control signal by said integrated signal to furnish a follow-back throttle displacement correction which decays with time.

3. An aircraft speed control system including airspeed measuring means, pick-off means responsive thereto to provide a signal dependent on deviation in airspeed of the craft from a selected airspeed value, means for providing a further signal dependent on vertical deviation of the aircraft from a selected flight path, means for combining said signals in such sense that deviation above the selected flight path provides a signal component which aids the signal component provided in response to deviation above the selected airspeed, servomotor means adapted to control the position of a speed device such as a throttle, means for providing a displacement signal corresponding initially to a displacement of said servomotor from an initial position, means for gradually reducing said displacement signal to zero, and means for energizing said servomotor in accordance with the difference between said combined signals and said displacement signal.

4. An aircraft speed control system including an airspeed meter, an electrical pick-off and means for coupling said pick-off to said meter to provide a signal voltage dependent on deviation in airspeed of the craft from a selected airspeed value, a radio glide path system for providing a further signal voltage dependent on vertical deviation of the aircraft from a selected flight path, means for combining said signals in such sense that deviation above the selected flight path provides a voltage component which aids the voltage component provided in response to deviation above the selected airspeed, servomotor means adapted to control the position of a speed control device such as a throttle, means for providing a signal voltage corresponding to the rate of displacement of said servomotor, means for integrating said rate signal voltage to provide a displacement signal, means for energizing said servomotor in accordance with the difference between said combined signals and said displacement signal, and means for gradually reducing said displacement signal to zero.

5. A control system for aircraft speed control comprising an airspeed measuring means, a pick-off associated therewith for supplying an error signal dependent on and proportional to deviation in airspeed of the craft from a selected airspeed value, means for supplying a second signal dependent on and proportional to change in the craft's position in elevation, a throttle valve for controlling the airspeed of said aircraft, a servomotor connected to operate said throttle valve, means for supplying a follow-back signal proportional to servomotor speed, means for integrating said last signal to provide a throttle displacement signal substantially proportional to a time integral of said signal, means for causing said signal to decay with time, whereby it slowly decreases to zero regardless of the final resting position of the throttle, and means for controlling said servomotor in accordance with the combination of all of said signals.

6. An aircraft speed control system for automatic pilots for automatic approach to landing fields including a selective airspeed measuring device, means for obtaining a signal therefrom proportional to the amount and sign of the error between the selected and measured airspeed, a glide path receiver detecting deviation from the approach glide path, means connected thereto giving a second control signal proportional to the amount and sign of the deviation, means for obtaining from at least one of said signals a signal proportional to the time rate of change thereof, an engine throttle servomotor, means for obtaining therefrom a signal proportional to the movement thereof and operative means connecting said servomotor to a combination of all the aforesaid signals to control said throttle servo, whereby throttle readjustment is accelerated upon either loss of airspeed or departure from the desired glide path.

7. An aircraft automatic approach system for the automatic pilots of aircraft having an automatic elevator control, including a radio receiver of the glide path type, means connected thereto providing a component signal proportional to the amount and sign of vertical deviation of the aircraft from a selected radio glide path, means operatively connecting through said signal, said receiver and elevator control for controlling the pitch attitude of the craft, engine control means, a servomotor for adjusting said means, a selective airspeed responsive device, means connected thereto providing a further component signal proportional to the amount and sign of deviation of the airspeed from the selected value, means producing a third component signal proportional to the time rate of change of at least the signal from the airspeed device, and circuit means connecting the three combined component signals to operate said servomotor.

8. An aircraft automatic approach system including a radio glide path receiver providing a signal proportional to the amount and sign of vertical deviation of the aircraft from a selected glide path, an elevator controller, means operatively connecting said signal to said controller for continuously controlling the pitch attitude of the craft, an airspeed responsive device providing a further signal proportional to the amount and sign of deviation in airspeed from a selected value, an engine controlling servomotor, means for producing a temporary signal proportional to initial movement of said servomotor, and operative means for combining said three signals to control said servomotor.

HAROLD S. HENDRICKSON.

References Cited in the file of this patent

UNITED STATES PATENTS

| Number | Name | Date |
|---|---|---|
| 2,133,285 | Dunmore | Oct. 18, 1938 |
| 2,191,250 | Fischel | Feb. 20, 1940 |
| 2,311,642 | Crane et al. | Feb. 23, 1943 |
| 2,464,629 | Young | Mar. 15, 1949 |
| 2,496,294 | Kellogg | Feb. 7, 1950 |
| 2,496,809 | Moseley | Feb. 7, 1950 |